United States Patent

Bohner et al.

[11] Patent Number: 6,102,150
[45] Date of Patent: Aug. 15, 2000

[54] VEHICLE STEERING MECHANISM

[75] Inventors: Hubert Bohner, Boeblingen; Martin Moser, Fellbach, both of Germany

[73] Assignee: DaimlerChrysler AG, Stuttgart, Germany

[21] Appl. No.: 09/171,365
[22] PCT Filed: Mar. 10, 1997
[86] PCT No.: PCT/EP97/01195
    § 371 Date: Oct. 16, 1998
    § 102(e) Date: Oct. 16, 1998
[87] PCT Pub. No.: WO97/39935
    PCT Pub. Date: Oct. 30, 1997

[30] Foreign Application Priority Data

Apr. 19, 1996 [DE] Germany ............... 196 15 544

[51] Int. Cl.⁷ .................................................. B62D 5/08
[52] U.S. Cl. ................................. 180/403; 180/406
[58] Field of Search ................... 180/402, 403, 180/405, 406

[56] References Cited

U.S. PATENT DOCUMENTS

| 4,553,389 | 11/1985 | Tischer et al. | 60/384 |
| 4,798,256 | 1/1989 | Fassbender | 180/406 |
| 5,826,676 | 10/1998 | Ko | 180/403 |
| 5,862,878 | 1/1999 | Bohner et al. | 180/403 |

FOREIGN PATENT DOCUMENTS

| 0137491B1 | 2/1988 | European Pat. Off. |
| 2652815A1 | 5/1978 | Germany . |
| 0307612A1 | 3/1989 | Germany . |
| 4133726A1 | 4/1992 | Germany . |
| 4207719A1 | 9/1993 | Germany . |

OTHER PUBLICATIONS

Patent Abstracts of Japan, Pub. No. 07125643A, Jun. 16, 1995, Toyota Motor Corp., Tanaka Hiroaki, Steering Control Device.

*Primary Examiner*—Kevin Hurley
*Attorney, Agent, or Firm*—Evenson, McKeown, Edwards & Lenahan, P.L.L.C.

[57] ABSTRACT

A vehicle steering system is provided with a manually operable steering member and a hydraulically operated steering actuator unit operable to control the steering movements of at least one vehicle wheel in response to movement of the steering member. Steering forces are transmitted between the steering member and actuator unit by a pair of selectively engageable independent hydraulic circuits. A safety valve arrangement is operable to switch operation between the two circuits.

10 Claims, 3 Drawing Sheets

VEHICLE STEERING MECHANISM

BACKGROUND AND SUMMARY OF THE INVENTION

The invention relates to a vehicle steering system having a steering grip control, in particular a steering wheel, which is activated by the driver, as well as a motor-operated actuator unit which is assigned to the steered wheels of the vehicle and to which the steering grip control is operatively connected via a controlled system, the controller of which is connected on the input side, for a desired value/actual value comparison, to a desired value transmitter which is activated by the steering grip control and to an actual value transmitter which registers the steering angle of the steered wheels of the vehicle.

At present, passenger cars and similar motor vehicles are as a rule equipped with hydraulic power-assisted steering systems in which the steering wheel is mechanically forcibly connected to the steered wheels of the vehicle, i.e. there is a mechanical drive connection between the steering wheel and steered wheels of the vehicle. Here, the steered wheels of the vehicle are also connected in terms of drive to a motor-operated actuator unit which is controlled as a function of the forces or moments transmitted between the steering wheel and steered wheels of the vehicle. For this purpose, components, for example shaft components, of the mechanical drive connection between the steering wheel and steered wheels of the vehicle are connected to one another in a sprung fashion so that the aforesaid components or shaft components execute a larger or smaller actuation travel or a larger or smaller rotation relative to one another depending on the respectively effective forces or moments. This actuation travel or this relative rotation then causes a servovalve which controls the hydraulic actuator unit to be activated.

As appropriate, an electroactuator unit can also be controlled by means of this actuation travel or the relative rotation.

In aeroplanes it is known to connect tail surfaces and wing flaps and the like to associated grip controls in a merely operative fashion via a controlled system, the grip control activating a desired value transmitter and the wing flaps or tail surfaces activating an actual value transmitter, and the controller of the controlled system processing the signals of the desired value transmitter and actual value transmitter in terms of a desired value/actual value comparison and controlling motor-operated actuator units for the tail surfaces or wing flaps as a function of the result of this comparison. This concept, which is also referred to as "fly by wire", has in the meantime become so reliable that even passenger aeroplanes are equipped in this way.

In principle, it is also possible to provide comparable arrangements in vehicle steering systems, as is shown in EP 05 39 823 A1. In the said publication, the mechanical drive connection between the steering grip control and steered wheels of the vehicle is, however, not completely dispensed with. Instead, there is merely provision for the mechanical drive connection to be deactivated when the controlled system is operating without faults. As a result, it is possible, during normal operation, to realize parameter-dependent steering kinematics which differ from the mechanical drive connection.

The object of the invention is, then, to specify an advantageous arrangement for a steering system of the type mentioned at the beginning.

This object is achieved according to the invention in that a hydraulic actuator unit, and to activate it, two separate hydraulic circuits with in each case their own control valve unit which differs structurally from the corresponding unit of the other hydraulic circuit, are provided and in that a safety valve arrangement can be switched over between a normal state, which can be switched on by means of motor-operated actuator drives without self-locking features and in which the one hydraulic circuit is active, and an emergency state, which can be switched on by means of continuously present restoring force when the actuator drives are switched off and in which the other hydraulic circuit is active.

The invention is based on the general idea that, while a mechanical drive connection between the steering grip control and steering wheels of the vehicle is dispensed with, as is the possibility of connecting the steering grip control and steered wheels of the vehicle merely operatively via a controlled system for steering activation of the steered wheels of the vehicle, hydraulic systems are used whose essential system components have also been used in conventional power-assisted steering systems and have proven highly reliable in that context.

Furthermore, an—asymmetrical—redundancy is ensured in that hydraulic circuits which are arranged in duplicate are provided with different control valve arrangements which are independent of one another.

Expediently, the control valve units of the controller have electromagnetic actuator drives which are controlled on the output side and whose electric power supply is provided under normal circumstances by a main battery of the vehicle, which can also supply other electric loads of the vehicle. In addition, an emergency battery may be provided in order, if appropriate, to have a second electric power supply.

If hydraulic pumps which are arranged in duplicate are then also provided, it being possible for the one hydraulic pump to be driven by the vehicle engine and the other hydraulic pump to be driven electrically, and if, furthermore, the possibility of, if appropriate, also using system components of a hydraulic circuit in the other hydraulic circuit by interlinking the hydraulic circuits with one another by means of shut-off valves, it is possible overall to implement an extremely reliable vehicle steering system without the necessity for a mechanical drive connection between the steering grip control and steered wheels of the vehicle. In this way, at the same time, the advantage is obtained over vehicles with mechanical forcible coupling between the steering grip control and steering wheels of the vehicle that, in the event of an accident, there is an increased possibility that the steering system will remain operational and that it will not be possible for the steering grip control to be displaced toward the driver by elements of the mechanical drive connection.

Other objects, advantages and novel features of the present invention will become apparent from the following detailed description of the invention when considered in conjunction with the accompanying drawings.

DETAILED DESCRIPTION OF THE DRAWINGS

In all the figures, the valves are represented in each case in their positions which they assume during normal operation.

Figure 1:
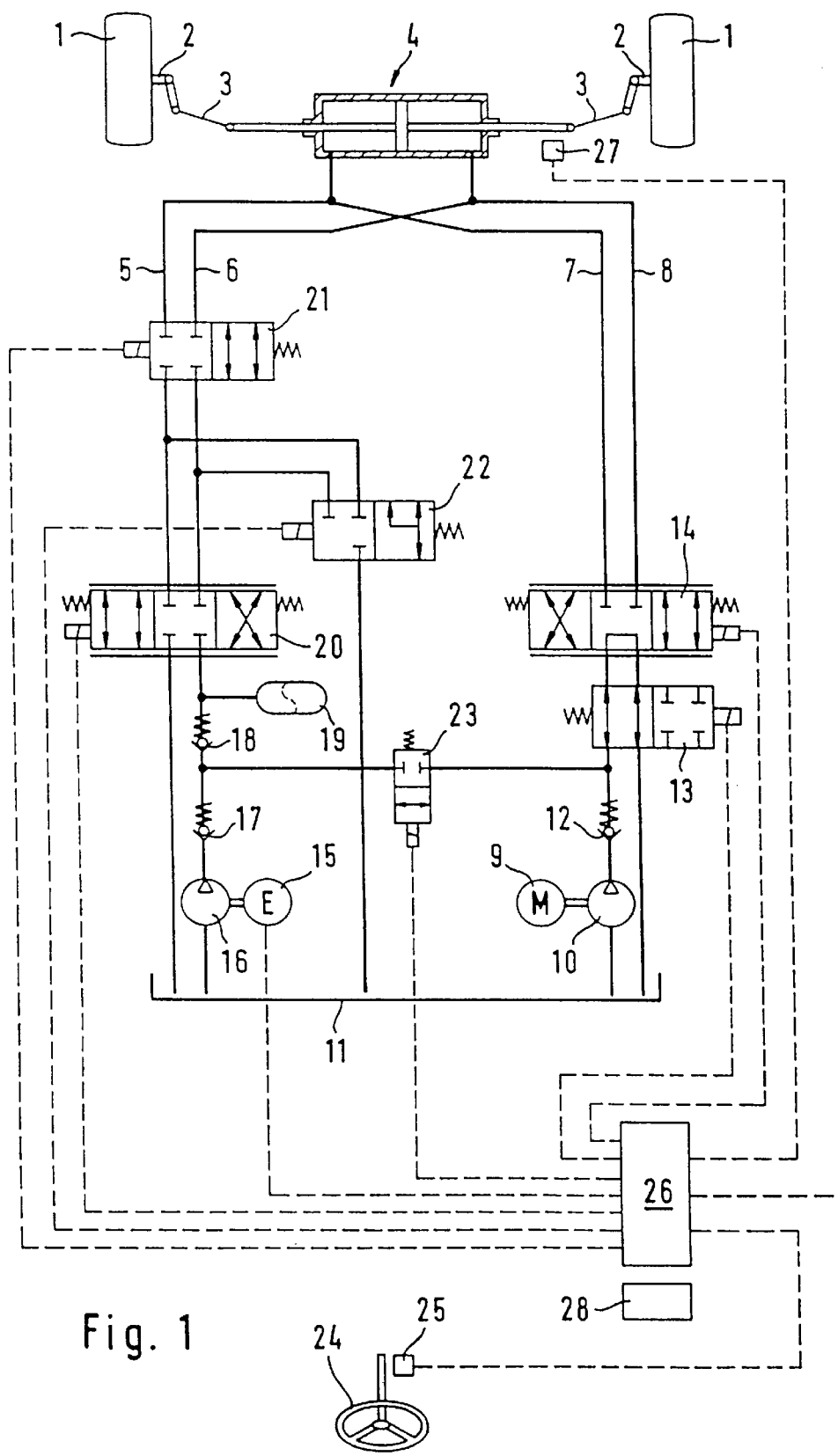
FIG. 1 shows a circuit diagram-like illustration of a first embodiment in which the hydraulic pump of the hydraulic circuit which is active, is connected under normal conditions on the delivery side in the central position of the assigned control valve unit, to a relatively unpressurized hydraulic reservoir.

According to FIG. 1, a motor vehicle which is otherwise not represented in more detail has, in the example illustrated, two steered wheels 1, which are each arranged on the wheel carrier 2 which is secured to the vehicle body in a sprung fashion and can pivot about a vertical axis of the vehicle in order to steer the steered wheels 1 of the vehicle. The wheel carriers 2 are connected via track rods 3 to a hydraulic actuator unit 4, which, in the example illustrated, is designed as a double-acting hydraulic piston-cylinder unit.

The two hydraulic chambers of the actuator unit 4 which are separated from one another by the piston of the hydraulic actuator unit 4 are connected to connecting lines 5, 6 and 7, 8 of two hydraulic circuits which are separated from one another.

A first hydraulic circuit which is assigned to the connecting lines 7 and 8 has a hydraulic pump 10 which is driven by the vehicle engine 9 and which is connected on the intake side to a relatively unpressurized hydraulic reservoir 11 and is connected on the delivery side to a port of a shut-off valve 13 designed as a 4/2 way valve, via a nonreturn valve 12, which is continuously loaded in the closing direction and which prevents a flow in the direction of the pump 10. This shut-off valve 13 also has one port which is connected to the reservoir 11 and two ports which are connected to a control valve unit 14. In its illustrated central position, said control valve unit 14, which is designed as a proportional valve, shuts off from the outside the connecting lines 7 and 8 which are connected to it, and connects the ports which communicate with the shut-off valve 13. In the case of deflection out of the central position, connections, which are throttled in a controllable fashion, are opened between the ports of the control valve unit 14 which lead to the shut-off valve 13, and the connecting lines 7 and 8.

The second hydraulic circuit has a hydraulic pump 16 which can be driven by electric motor 15 and is in turn connected on the inlet side to the hydraulic reservoir 11 and on the delivery side, via two nonreturn valves 17 and 18 which are continuously loaded in the closing direction and which permit only one hydraulic flow leading away from the pump 16, to a hydraulic accumulator 19, on the one hand, and to a port of a control valve unit 20 designed as a 4/3 way valve, on the other. The further ports of the control valve unit 20 are connected to the reservoir 11, on the one hand, and to the connecting lines 5 and 6, via a shut-off valve 21 which is in turn designed as a 4/2 way valve, on the other.

By means of a shut-off valve 22, the connecting lines between the control valve unit 20 and the shut-off valve 21 can be shut off from one another or connected to one another and/or to the reservoir 11.

A shut-off valve 23 is provided between the outlets of the nonreturn valves 12 and 17.

A steering wheel 24, which is activated by the driver, is connected in terms of drive to a desired value transmitter 25 for the desired steering angle of the steered wheels 1 of the vehicle. This desired value transmitter 25 is connected to an input of a computer 26 which is connected via a further input to an actual value transmitter 27 which registers the actual steering angle of the steered wheels 1 of the vehicle.

Furthermore, the computer 26 can be connected on the input side to further sensors and/or signal transmitters for additional parameters.

On the output side, the computer 26 controls the actuator magnets of the valves 13, 14 and 20 to 23 as well as the electric motor 15, it being possible for the computer 26 and the actuator magnets and the electric motor 15 controlled by it to be assigned an additional battery 28 which is separate from a main battery of the vehicle, so that an electric power supply can be ensured under emergency conditions even if the main battery fails or a fault occurs within the network fed by the main battery.

The arrangement illustrated operates as follows:

Under normal conditions, the valves 13 and 20 to 23 are in the positions illustrated. The computer 26 controls the proportional valve 14 on the basis of a desired value/actual value comparison carried out between the signals of the desired value transmitter 25 and the signals of the actual value transmitter 27, i.e. when there is a diminishing difference between the desired value and the actual value the proportional valve 14 assumes the illustrated central position in which the piston of the actuator unit 4 is virtually blocked and the steered wheels 1 maintain without change the steering angle which has been set. In this state of the proportional valve 14, the pump 10 which is driven by the vehicle engine 9 delivers only in circulation mode, since the delivery side of the pump 10 is connected via the proportional valve 14 to the reservoir 11, to which the inlet side of the pump 10 is also connected. As soon as a deviation occurs between the desired values/actual values of the steering angle, the proportional valve 14 is moved out of the illustrated central position to a greater or lesser extent in one or other direction, with the consequence that a greater or lesser hydraulic pressure difference in one direction or the other occurs between the two sides of the piston of the actuator unit 4 and leads to a more or less rapid adjustment of the actuator unit 4, and thus to a change in the steering angle of the steered wheels 1 of the vehicle.

If the proportional valve 14 has a fault, the actuator unit 4 can readily be activated by means of the control valve 20. For this purpose, the shut-off valve 21 is opened. As soon as the control valve 20 is then moved out of the completely closed central position in one or other direction by the computer 26 owing to a deviation between the desired values and actual values of the steering angle, the actuator unit has the pressure of the accumulator 19 applied to a greater or lesser extent to one side of its piston, said accumulator 19 being kept continuously charged even during normal operation and being recharged by the pump 16 and/or the pump 10 during the following operation depending on the position of the shut-off valve 23. In order to permit the recharging operation by means of the pump 10, the shut-off valve 13 is, as appropriate, closed so that the inlet side of the pump 10 does not have any connection to the reservoir 11 despite the open center of the proportional valve 14.

The control valves 14 and 20 are preferably of a structurally differing design in that, for example, the proportional valve 14 is designed as a slide valve and the control valve 20 is designed as a seat-controlled valve. If both valves are designed as slide valves, they should have different degrees of play between the slide and housing in order to avoid simultaneous blocking of both valves 14 and 20 in the event of possible contamination of the hydraulic medium.

By opening these shut-off valves 21 and 22 it is possible, as appropriate, to place the actuator unit 4 in the unpressurized setting in any operational state and thus to switch to no-load operation. In this way, it is possible, if appropriate, to control the steered wheels 1 by means of a further system (not illustrated), for example by means of a braking intervention which is different at the right-hand and left-hand steered wheels 1 of the vehicle.

In a departure from the embodiment illustrated, it is possible, as appropriate, to provide a further shut-off valve, similar to the shut-off valve 21, between the proportional valve 14 and the actuator unit 4, this shut-off valve normally assuming its open position. This further shut-off valve can, as appropriate, be closed when the control valve 14 blocks, in order to prevent hydraulic medium flowing away from the actuator unit 4 to the reservoir 11 via the valve 14 irrespective of the blocked position of the valve 14.

Figure 2:
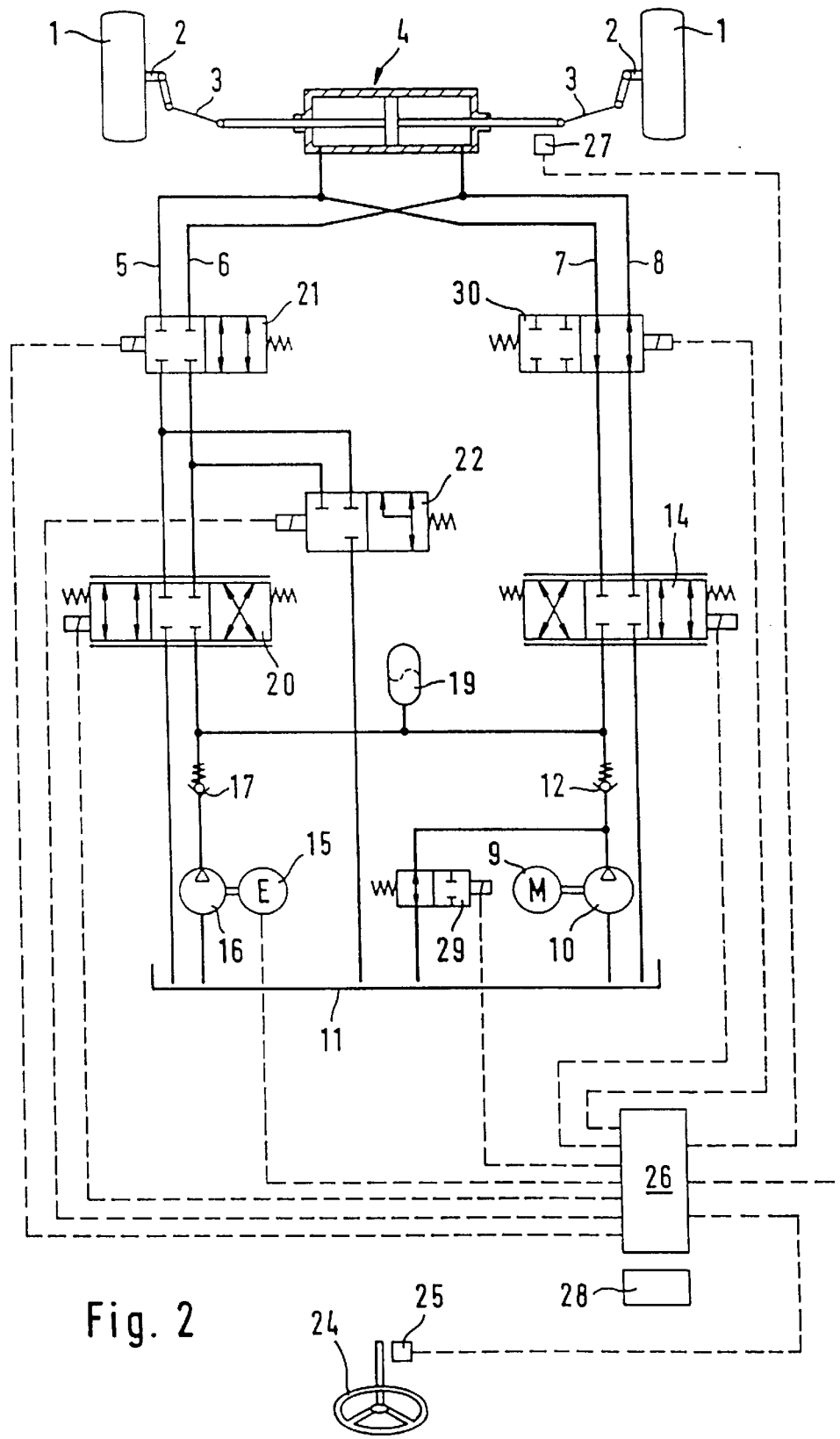
FIG. 2 shows a variant which is modified with respect to the embodiment in FIG. 1 and in which the control valve unit of the hydraulic circuit which is active under normal conditions has an enclosed center.

The embodiment in FIG. 2 differs from the embodiment according to FIG. 1 initially by virtue of the fact that the proportional valve 14 has a completely closed center which does not permit any discharge whatsoever of hydraulic medium from the delivery side of the pump 10 to the reservoir 11. Since the pump 10 is continuously driven by the vehicle engine 9, and thus continuously feeds hydraulic medium, a changeover valve 29 is provided which is open in the central position of the proportional valve 14 if the hydraulic accumulator 19, which, in the example in FIG. 2, can also be continuously recharged via the pump 10, is sufficiently charged.

Moreover, FIG. 2 illustrates the further shutoff valve 30 between the proportional valve 14 and the actuator unit 4, said valve having been only mentioned before during the description relating to FIG. 1. This valve 30 is closed in the event of faults in the valve 14 when the actuator unit 4 is to be activated after the valve 21 has been opened by means of the control valve 20.

Figure 3:
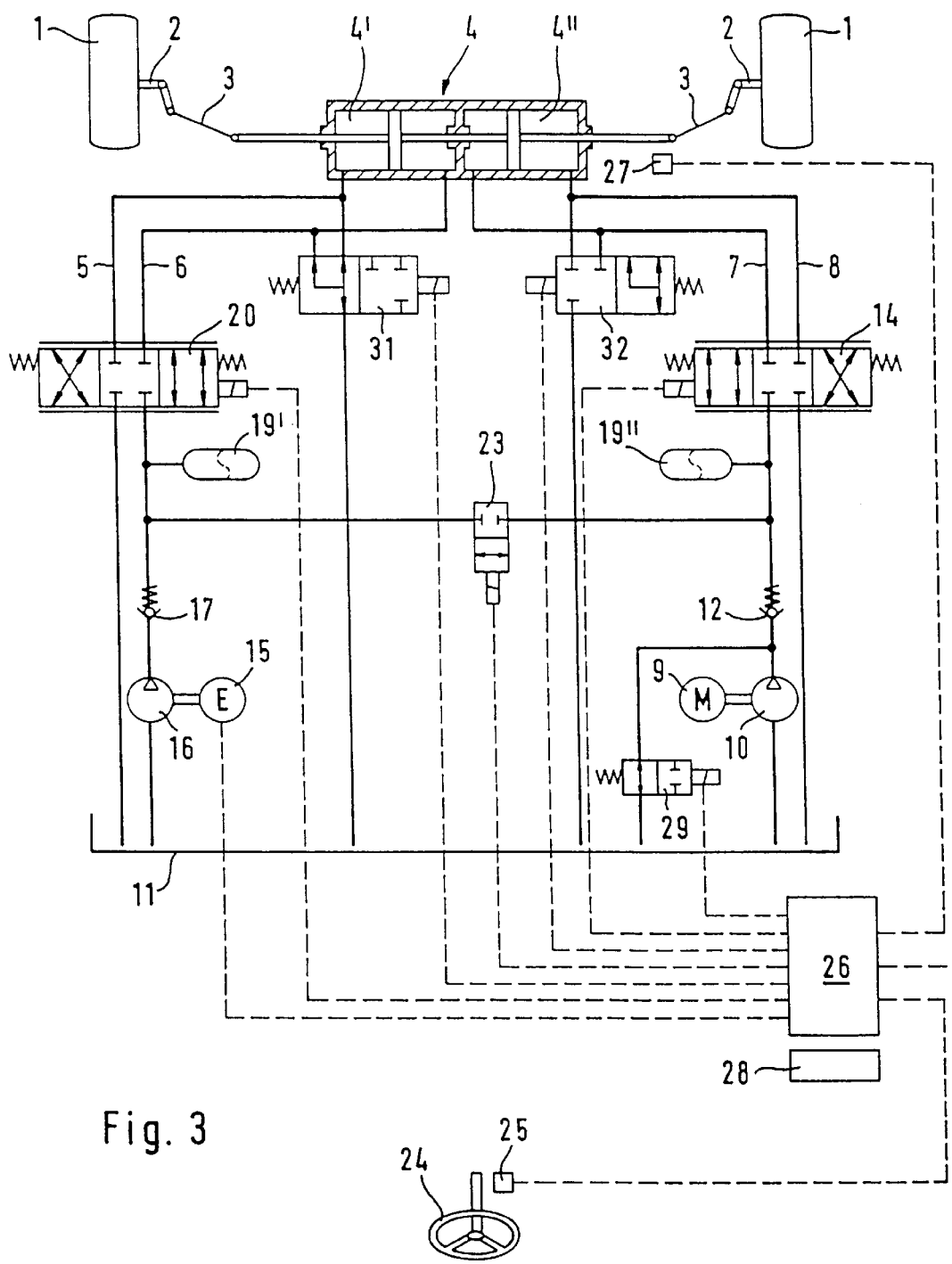
FIG. 3 shows an embodiment in which the hydraulic actuator unit of the steered wheels of the vehicle is also present in duplicate.

FIG. 3 illustrates a system in which the actuator unit 4 has two piston-cylinder elements 4' and 4" which are forcibly coupled to one another, arranged in parallel and can each be switched by shut-off valves 31 and 32, irrespective of the positions of the proportional and control valves 14 and 20, to no load operation, i.e. to a setting in which their piston working spaces are connected to one another and to the reservoir 11. Under normal conditions, the shut-off valve 31 is open and the shut-off valve 32 is kept closed so that only the piston-cylinder unit 4" can be activated.

The control and proportional valves 14 and 20 are both designed with a completely closed center.

Each of the pumps 10 and 16 is assigned a separate hydraulic pressure accumulator 19' and 19" on the delivery side.

While the pump 16 is driven, as in the embodiments in FIGS. 1 and 2, by means of a controllable electric motor 15 which can be deactivated if appropriate, and accordingly can always operate in accordance with demand, the pump 10 is in turn driven by the vehicle engine 9—independently of the respective delivery demand—in which case the actual feed rate to the accumulator 19" and/or to the proportional valve 14 is then controlled by controlling the changeover valve 29.

The connecting line which is preferably provided between the accumulators 19' and 19" and has the shut-off valve 23 provides the possibility of being able to charge each of the accumulators 19' and 19" by means of each of the pumps 10 and 15.

In the event of faults in or at the hydraulic circuit on the piston-cylinder unit 4" side, the shutoff valve 32 is opened while the shut-off valve 31 is simultaneously closed so that the piston-cylinder unit 4' can then be activated by controlling the control valve 20.

In all the illustrated exemplary embodiments, the pumps 10 and 16 can, if appropriate, also operate in tandem mode, since both pumps 10 and 16 can each be connected, and/or are connected, to each of the valves 14 and 20.

Moreover, each of the pumps 10 and 16 of the one hydraulic circuit can be connected into the respective other hydraulic circuit.

In all the embodiments, the valves can, at least to a certain extent, be designed such that they are forced into their positions provided for emergency settings by means of actuator springs, and accordingly the actuator magnets which are without self locking and are provided for adjusting the valves with respect to the valve springs only have to be switched off by the electric power supply.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle steering system having a steering wheel, which is activated by the driver, as well as a motor-operated actuator unit which is operably connected to the steered wheels of the vehicle and to which the steering wheel is operatively connected via a controlled system, the controller of which is connected on the input side, for a desired value/actual value comparison, to a desired value transmitter which is activated by the steering grip control and to an actual value transmitter which registers the steering angle of the steered wheels of the vehicle, wherein a hydraulic actuator unit is provided as the actuator unit, and to activate it, two separate hydraulic circuits with in each case their own control valve unit, which differs structurally from the corresponding unit of the other hydraulic circuit, are provided, and wherein a safety valve arrangement can be switched over between a normal state, in which the one hydraulic circuit is active, and an emergency state, in which the other hydraulic circuit is active.

2. The vehicle steering system as claimed in claim 1, wherein the actuator unit is a single actuator unit which can be connected to both hydraulic circuits, connecting lines which are assigned to the hydraulic circuit being capable of being shut off by means of one of the control valve unit which is assigned to the respective hydraulic circuit and separate shut-off valves.

3. The vehicle steering system as claimed in claim 1, wherein the actuator unit has two activation units which are parallel to one another and which are each assigned to one of the hydraulic circuits.

4. The vehicle steering mechanism as claimed in claim 1, wherein pumps which are arranged in duplicate are provided in the respective hydraulic circuits and have drives which are independent of one another.

5. The vehicle steering system as claimed in claim 4, wherein the one pump can be driven by the vehicle engine and the other pump can be driven by means of a controllable electric motor.

6. The vehicle steering system as claimed in claim 4, wherein the delivery sides of the pumps are connectable to one another.

7. The vehicle steering system as claimed on, claim 1, wherein the valve control units have a differing design.

8. The vehicle steering system as claimed in claim 1, wherein, in addition to an electrical system of the vehicle, an emergency power supply is provided.

9. The vehicle steering system as claimed in claim 5, wherein the delivery sides of the pumps are connectable to one another.

10. The vehicle steering system as claimed in claim 8, wherein the emergency power supply includes a battery.

* * * * *